United States Patent
Uchiyama

Patent Number: 6,064,419
Date of Patent: May 16, 2000

[54] TIMINGS OF ROTATIONAL SPEED IN A LASER BEAM PRINTER

[75] Inventor: Seiji Uchiyama, Tokyo, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/576,378

[22] Filed: Dec. 21, 1995

[30] Foreign Application Priority Data

Dec. 28, 1994 [JP] Japan .................................. 6-327501
Apr. 7, 1995 [JP] Japan .................................. 7-082500

[51] Int. Cl.⁷ .................................. B41J 2/47; B41J 2/435
[52] U.S. Cl. ................................................ 347/250; 347/235
[58] Field of Search .................... 347/235, 250, 347/248, 234

[56] References Cited

U.S. PATENT DOCUMENTS

| | | | |
|---|---|---|---|
| 3,809,806 | 5/1974 | Walker et al. | 178/7.6 |
| 3,848,087 | 11/1974 | Carrell | 178/7.6 |
| 4,306,242 | 12/1981 | Jeffery | 346/1.1 |
| 4,491,399 | 1/1985 | Bell | 352/92 |
| 4,578,689 | 3/1986 | Spencer et al. | 346/160 |
| 4,809,025 | 2/1989 | Noguchi | 346/154 |
| 5,043,744 | 8/1991 | Fantuzzo et al. | 355/208 |
| 5,164,745 | 11/1992 | Matsuoka | 346/108 |
| 5,191,359 | 3/1993 | Tsuzuki et al. | 346/108 |
| 5,349,374 | 9/1994 | Arai et al. | 346/108 |
| 5,373,518 | 12/1994 | Uchiyama et al. | 372/38 |
| 5,448,267 | 9/1995 | Sugiura et al. | 347/260 |
| 5,463,410 | 10/1995 | Uchiyama et al. | 347/133 |
| 5,475,414 | 12/1995 | Isaka et al. | 347/129 |
| 5,519,500 | 5/1996 | Kumamoto | 358/296 |
| 5,541,637 | 7/1996 | Ohashi et al. | 347/248 |
| 5,550,573 | 8/1996 | Serizawa et al. | 347/246 |
| 5,565,906 | 10/1996 | Schoon | 347/248 |
| 5,570,195 | 10/1996 | Honbo | 358/302 |
| 5,610,651 | 3/1997 | Yamakawa et al. | 347/250 |
| 5,864,355 | 1/1999 | Bush et al. | 347/235 |

FOREIGN PATENT DOCUMENTS

| | | |
|---|---|---|
| 0 482 641 | 4/1992 | European Pat. Off. |
| 55-157723 | 12/1980 | Japan. |
| 3-223711 | 10/1991 | Japan. |

*Primary Examiner*—Safet Metjahic
*Assistant Examiner*—Christopher Mahoney
*Attorney, Agent, or Firm*—Fitzpatrick, Cella, Harper & Scinto

[57] ABSTRACT

A laser beam printer which detects the position of a laser beam in order to scan a photosensitive member. The laser beam is detected at a predetermined position, wherein the laser beam is detected at a time during which a rotating polygon mirror is rotating at a speed less than a predetermined speed. Laser beam detection signals are then output. A timing of the output of the detection signals is predicted, wherein the detection signals are not output at a constant interval because the rotating polygon mirror is rotating at a speed less than the predetermined speed. A signal to turn on the laser beam is generated based on the predicted timing. In another aspect, a line for the detection signals is completed or broken at a timing based on an output interval of the detection signals.

28 Claims, 14 Drawing Sheets

TIMINGS OF ROTATIONAL SPEED IN A LASER BEAM PRINTER

BACKGROUND OF THE INVENTION

1. Field of the Invention

The present invention relates to a laser beam printer which deflects a laser beam, modulated by an image signal, using deflecting means such as a rotating polygon mirror in order to scan a photosensitive member.

2. Description of the Related Art

FIG. 13 illustrates the construction of a conventional laser beam printer, and will be used to describe image formation by a laser beam printer.

Reference numeral 101 denotes an image signal (VDO signal) which is input to a laser beam unit 102. Reference numeral 103 denotes a laser beam subjected to on/off modulation by the aforementioned laser beam unit 102. Reference numeral 104 denotes a scanner motor which rotates a rotating polygon mirror 105. Reference numeral 106 denotes an image forming lens which focuses the laser beam 103, deflected by the polygon mirror 105, on a photosensitive drum 108.

The laser beam 103, modulated by the image signal 101 and deflected by the polygon mirror 105, horizontally scans the photosensitive drum 108 along the main scanning dimension. Reference numeral 109 denotes an optical/electrical conversion device which outputs a photoelectric conversion signal 110 upon irradiation by the laser beam 103. (This signal 110 will hereinafter be referred to as the "BD signal"). The BD signal 110 is transmitted to an image controller (not shown) which synchronizes with the BD signal 110 in order to synchronize the input of the image signal 101. Reference numeral 112 denotes a transfer paper used by a transfer device (not shown) for transferring a toner image thereon, the toner image being a latent image formed on the photosensitive drum 108 and being made visible by a developing device (not shown).

A description will now be given of controlling signals utilized for image formation, with reference to FIG. 14.

In transferring a toner image formed on the photosensitive drum 108 onto the transfer paper 112, a laser beam exposable area (or image forming area) 122 is provided on the photosensitive drum 108 so that the entire formed toner image is transferred onto the transfer paper 112. The image controller (not shown) which outputs the image signal 101 is often not a component of the apparatus that comprises the engine control section, which controls the printer engine, but is a component of a different apparatus, or of an external computer. When the image controller turns on the image signal 101 in a non-image region of the photosensitive drum 108 and the laser beam 103 is turned on, the resulting toner image is not transferred to the transfer paper 112. This causes staining in the printer and on the reverse side of the transfer paper. To solve this problem, the laser beam 103 is not turned on when an image signal 101 is turned on outside the image forming area 122. The size of the image forming area 122 is determined by the size of the transfer paper 112.

A description will now be given of the signals required for forming an image corresponding to a main scanning line 123 onto the transfer paper 112. As described earlier, the BD signal 110 is a main scanning dimension synchronization signal, therefore other signals are generated so as to be in synchronism with the BD signal 110.

The mask signal 125 is a signal which is turned on and off in accordance with the image forming area 122, and which intercepts the image signal 101 when scanning is performed outside the image forming area in order to prohibit exposure of the photosensitive drum 108 outside the image forming area 122.

The BD input permission signal 127 is a signal which permits input of the BD signal 110. This signal does not allow the BD signal 110 to be accepted until a predetermined period of time from the previous BD signal 110. Accordingly, the BD input permission signal 127 masks the BD signal 110 for a predetermined time period to prevent positional displacement along the main scanning dimension.

The unblanking signal 128 is a timing signal for turning on the laser when the laser beam is employed to scan the detection device 109, which generates the BD signal 110. Like the BD input permission signal 127, the unblanking signal 128 is a signal which is generated for a predetermined period of time from the input of the previous BD signal 110.

A description will now be given of the circuits generating a control signal along the main scanning dimension, with reference to FIG. 15. Reference numeral 16 denotes a CPU for controlling the scanning sequence of the laser beam printer, not only along the main scanning dimension but also along the sub-scanning dimension, and for performing other operations. In FIG. 15, circuits other than those required for main scanning control are not shown. Reference numeral 1 denotes an address bus which selects registers 2 via an address decoder 15. Reference numeral 9 denotes a data bus used in writing data from the CPU 16 to each register 2 or reading data from each register 2 into the CPU 16. Each register 2 is provided for storing a count value for generating or terminating the mask signal 125, the BD input permission signal 127, and the unblanking signal 128.

The count values, stored in the registers 2, are compared with the content of the main scanning counter 13, which starts counting upon generation of the BD signal 110 and thereby generates the previously mentioned signals. Comparators 3 are provided to compare the count values, stored in the various registers 2, with the value of the main scanning counter 13. Reference numeral 18 denotes J/K flip-flop sections which synthesize various start timing signals and end timing signals to generate the mask signal 125 and the unblanking signal 128, which are sent to an image control signal generating section 17. Based on these signals, a laser emitting permission signal 6 and a forced laser lighting signal 7 are sent from the image control signal generating section 17 to the laser unit.

On the other hand, the BD input permission signal 127 is sent to a BD signal masking circuit 19, which accepts the BD signal 110 only when the BD input permission signal 127 is active.

The scanner motor 104, causing laser beam scanning, is controlled so as to synchronize an FG signal generated in proportion to the rotating speed with a reference clock by speed feedback or phase feedback (PLL control). Although, in general, FG signals are used to detect the rotation, BD signals may also be used to increase rotation precision quite easily.

However, when the rotation of the scanner motor 104 is controlled by, for example, a BD signal 110, the laser must be turned on before the scanner motor 104 starts rotating at a fixed speed in order to generate the BD signal 110, which gives rise to the following problems.

Since it is necessary to turn on the laser from the time before the scanner motor starts rotating at a fixed speed, a beam of slow scanning speed irradiates the photosensitive drum 108. Thus, the photosensitive drum 108 receives a greater amount of energy than is received when forming an ordinary image, which deteriorates part of the drum.

In controlling the scanner motor using a BD signal, it is necessary to intermittently turn on the laser during the start-up time of the scanner motor. Although the start-up time of the scanner motor is ordinarily a few seconds, these seconds add up to a length of time large enough to decrease the lifetime of the laser chip in the case where intermittent printing is to be performed.

In addition, the shorter the active period of the BD input permission signal 127, the less likely is erroneous detection of the BD signal 110 due to noise. However, if this period becomes too short, and if imprecise surface division of the rotating polygon mirror results in a longer scanning time (main scanning period) of the surface than expected, the BD signal 110 generated outside the BD input permission range may not be detected, even when the scanner motor has shifted only by a small amount.

FIG. 16 illustrates a path taken by the BD signal when a scanner motor has shifted. With the waveform of the BD signal denoted by reference numeral 61, the BD signal path is as denoted by reference numeral 63 along the vertical time axis (along the direction denoted by reference numeral 62). The broken lines, denoted by reference numeral 64, indicate the time period the BD input permission signal is permitting the input of the BD signal 110. The shorter this time period, the less the printer is affected by noise introduced into BD signals, etc. However, as indicated by the path 63, when the BD signal 110 strikes an area outside the input permission range, the BD signal 110 cannot be detected, even when the scanner motor has shifted by only a small amount. In recent years, this problem has been particularly apparent with the realization of high-speed image formation because of greater noise effects resulting from the use of a high-frequency clock or the like.

SUMMARY OF THE INVENTION

Accordingly, an object of the present invention is to solve the above-described prior art problems.

Another object of the present invention is to provide a laser beam printer capable of preventing deterioration of the photosensitive drum as well as preserving the laser lifetime.

According to the present invention, it is possible to obtain a BD signal, without intermittently turning on a laser, by predicting the next BD signal generation timing before the scanner motor starts rotation at a fixed speed and by generating an unblanking signal.

A further object of the present invention is to provide a laser beam printer capable of controlling the scanner motor based on the BD signal, while at the same time preventing deterioration of the photosensitive drum and preserving the life of the laser device.

A still further object of the present invention is to provide a laser beam printer capable of preventing erroneous control of the scanner motor caused by noise.

A still further object of the present invention is to provide a laser beam printer capable of reliably and accurately detecting the BD signal, while at the same time preventing erroneous detection of the BD signal caused by noise as well as assuring BD signal detection.

A still further object of the present invention is to provide a laser beam printer which can reliably and accurately detect a BD signal to prevent image displacement as well as omission of scanning line modulation, thus making it possible to form a high quality image.

A still further object of the present invention is to provide a laser beam printer capable of determining the proper period for the BD signal input permission range when a variation in the rotation speed of the polygon mirror occurs.

A still further object of the present invention is to provide a laser beam printer capable of determining a proper BD signal send-out permission period when a variation in the rotation speed occurs, wherein the printer indicates an image abnormality caused by changes in the rotation speed.

The present invention aims at increasing the noise resistance of the laser beam printer by determining the BD signal input permission range based on the period of the previous or earlier BD signal in order to narrow the BD input permission range as much as possible.

According to one aspect, the present invention is a laser beam printer which includes a rotating polygon mirror for deflecting a laser beam in order to scan a photosensitive member and a laser beam detecting means for detecting the laser beam at a predetermined position and for outputting detection signals. The laser beam is detected at a time during which the rotating polygon mirror is rotating at a speed less than a predetermined speed. The laser beam printer also includes a detection signal predicting means for predicting a timing of the output of the detection signals from the laser beam detecting means. The detection signals are not output at a constant interval because the rotating polygon mirror is rotating at a speed less than a predetermined speed. The laser beam printer also includes signal generating means for generating a signal to turn on the laser beam based on the timing predicted by the predicting means.

According to another aspect, the present invention is a laser beam printer which includes a rotating polygon mirror for deflecting a laser beam in order to scan a photosensitive member and detecting means for detecting the laser beam at a predetermined position after the laser beam has been deflected by the rotating polygon mirror. The detecting means also outputs detection signals. Furthermore, the laser beam printer includes measuring means for measuring an output interval of the detection signals output from the detecting means and detection signal line completing/breaking means for completing or breaking a line for the detection signals output from the detecting means at a timing based on the output interval measured by the measuring means.

These and other objects, features, and advantages of the invention will become apparent from the following detailed description of the preferred embodiments of the present invention and the accompanying drawings.

DESCRIPTION OF THE PREFERRED EMBODIMENTS

Figure 13:
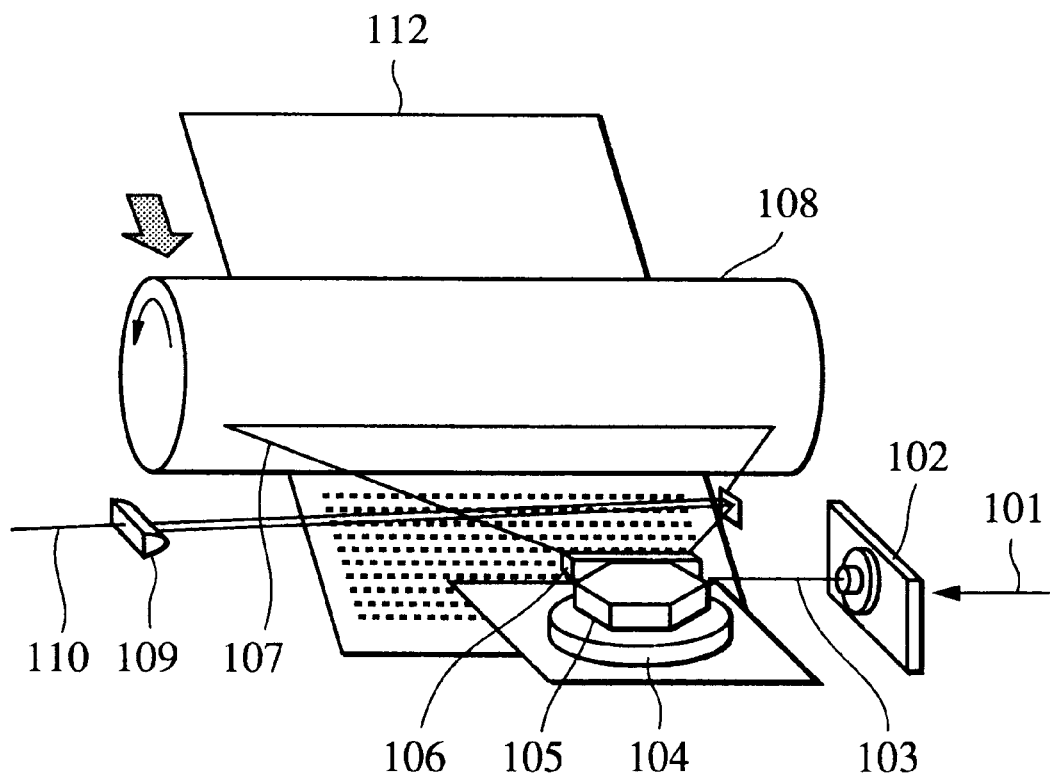
FIG. 13 is a diagram for de-scribing a construction of a laser beam printer.
Figure 14:
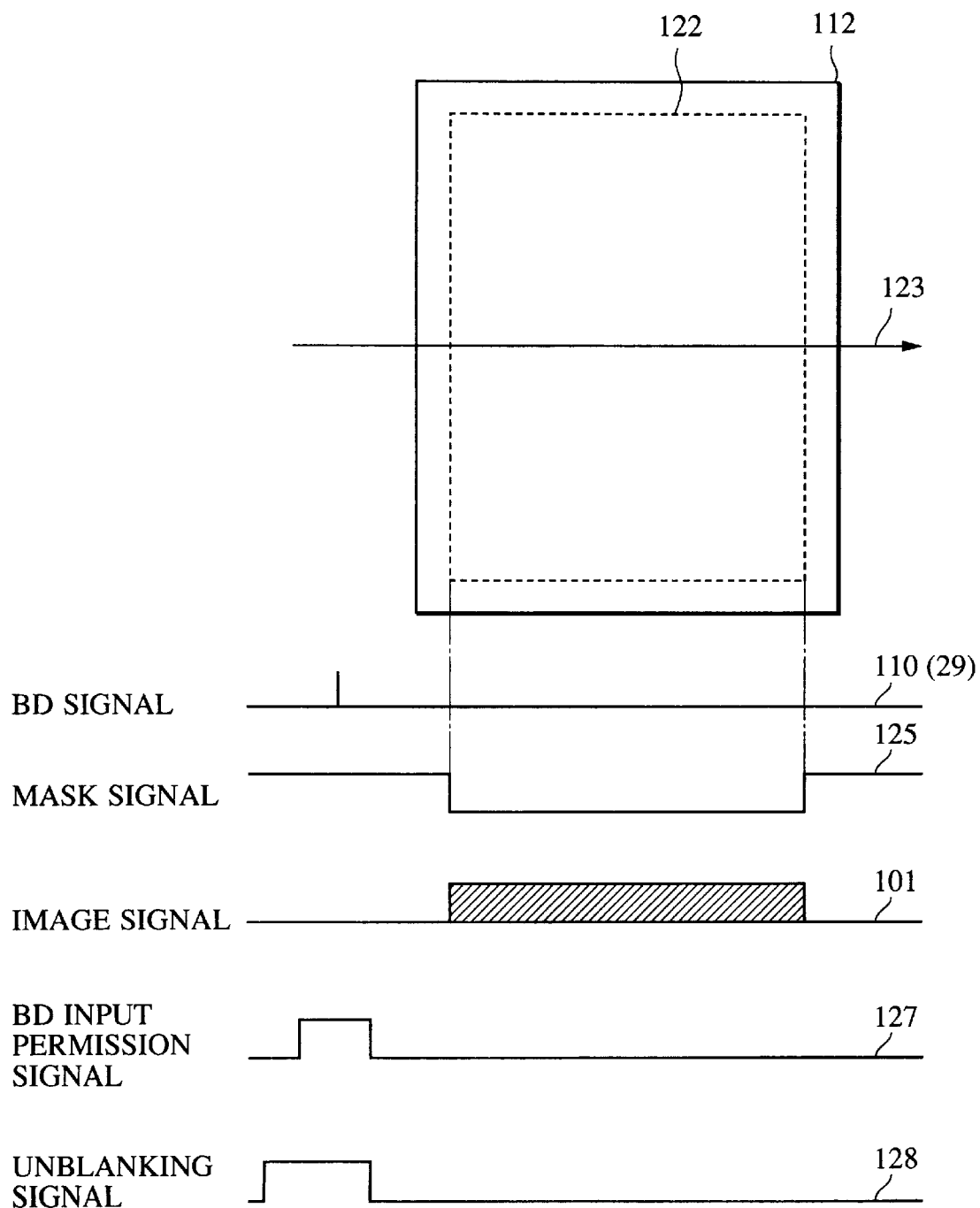
FIG. 14 is a diagram for describing a main scanning dimension signal.

A description will now be given of the preferred embodiments of the invention, with reference to the attached drawings. In each of the following embodiments, the printer has essentially the same construction as illustrated in FIG. 13 and the BD signal is essentially the same as illustrated in FIG. 14. Therefore, descriptions of the construction and the signal will be omitted from the following descriptions.

Embodiment 1

Figure 1:
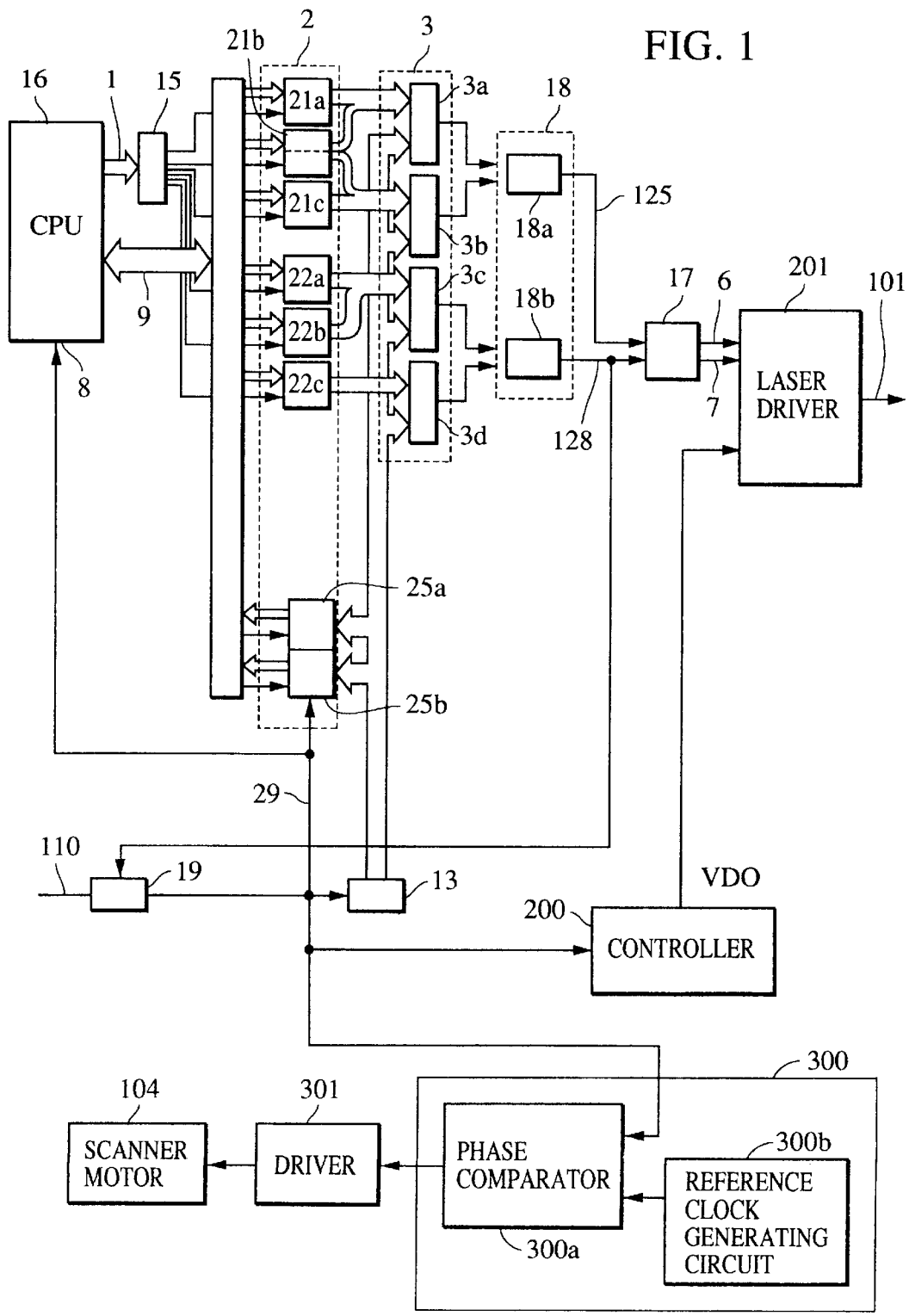
FIG. 1 is a circuit diagram for describing a first embodiment of the present invention.
Figure 15:
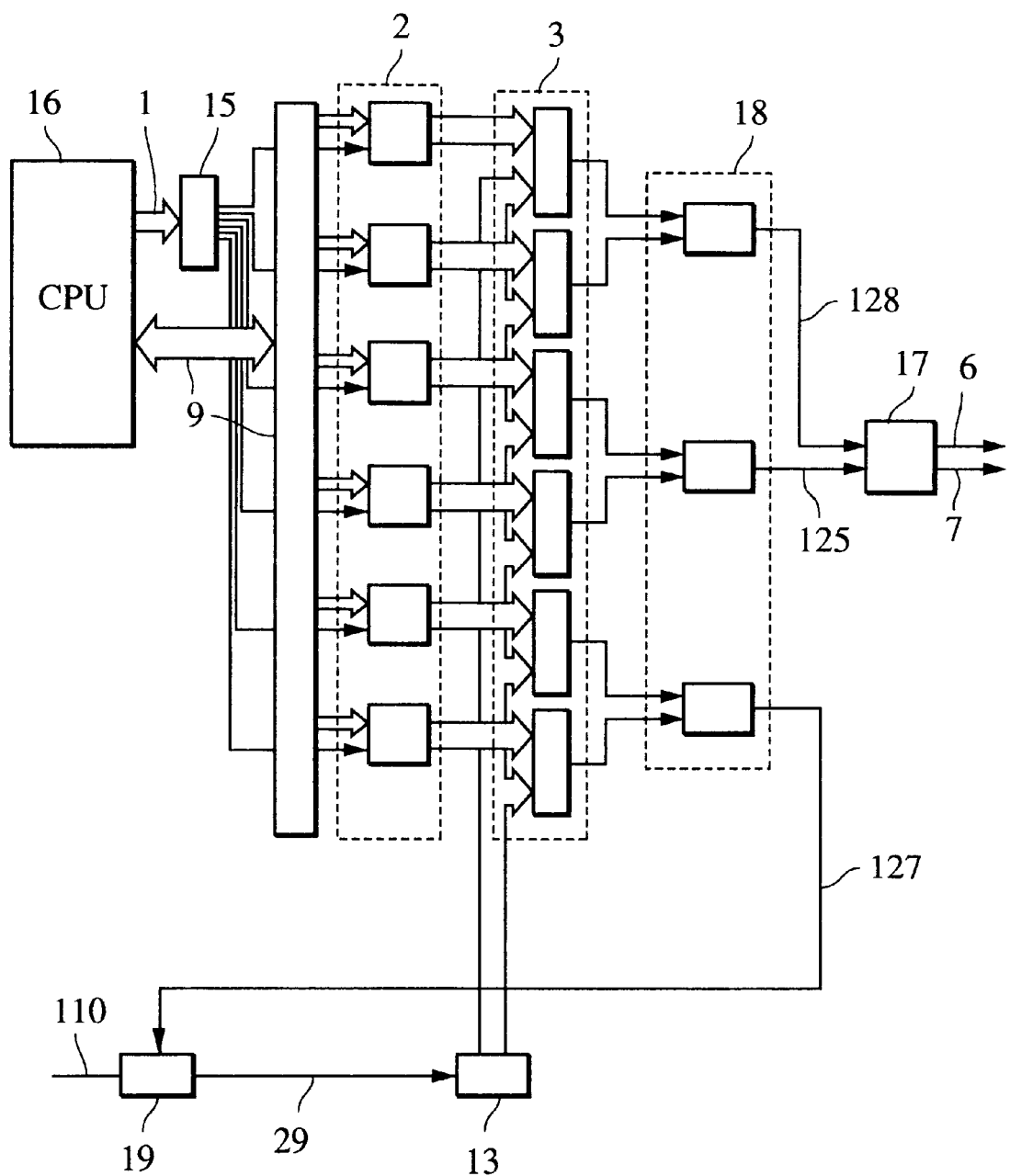
FIG. 15 is a circuit diagram for describing a main scanning dimension signal.

FIG. 1 is a block diagram of an electrical configuration of the first embodiment of the present invention, wherein parts having substantially the same functions and processing substantially the same signals as those in FIG. 15 are given the same reference numerals.

Referring to the figure, reference numeral 16 denotes a CPU for controlling the entire scanning sequence of the laser beam printer, which not only controls along the main scanning dimension but also along the subscanning dimension, and performs other control operations such as electrophotographic process control. Reference numeral 1 denotes an address bus from the CPU 16. Based on the address signal, an address decoder 15 selects 8-bit registers 21a to 21c, 22a to 22c, 25a, and 25b (hereinafter generally referred to as registers 2). Reference numeral 9 denotes a data bus (of 8 bits, for example) for reading and writing data into a selected register. The registers 2 have stored therein the values for determining the timing of generation and termination of the aforementioned mask signal 125, BD input permission signal 127, and unblanking signal 128. In the embodiment, however, the BD input permission signal 127 and the unblanking signal 128 use the same timing values.

The values stored in these registers 2 are compared with count values of a main scanning counter 13, which starts counting upon a BD signal 29, to generate the various signals. Comparators 3a to 3d (hereinafter referred to generally as comparators 3) are provided for comparing the values in the various registers 2 with those of the main scanning counter 13. When the rotating polygon mirror 105 is rotating at a predetermined speed for image formation, the main scanning counter 13 counts up to a count value employing up to 12 bits. However, in the present embodiment, the main scanning counter 13 is a 16-bit counter for the purpose of allowing measurement of the output interval of the BD signal 29 when the rotating polygon mirror 105 is rotating at a speed below the predetermined speed.

The mask signal 125 is enabled at the time of image formation, when the rotating polygon mirror is rotating at a predetermined speed. The start timing of the mask signal 125 is specified by the 8 bits of the register 21a and the 4 bits of the register 21b, 12 bits in total, and the end timing is specified by the 4 bits of the register 21b and the 8 bits of the register 21c, also 12 bits in total. The comparators 3a and 3b compare these 12-bit values with the count value represented by the lower 12 bits of the main scanning counter 13 in order to enable and disable the mask signal 125 at the proper times.

The unblanking signal (BD input permission signal 127) 128 is also output when the rotating polygon mirror (scanner motor) is started. The start timing is specified by the 16-bit count value in the registers 22a and 22b. The comparator 3c compares the 16-bit value with the 16-bit count value of the main scanning counter 13. The laser beam 103 turns off immediately after output of the BD signal 29, so the count value corresponding to the end timing may be small. In this embodiment, the comparator 3d compares the 4-bit value of the register 2c with the 3rd- to 6th-bit count value of the main scanning counter 13 in order to determine the proper end time for the signals. However, the number of bits of the data bus, the registers, and the counter 13 are not limited to the aforementioned values. The number of bits of the counter 13, however, is greater than the number of bits required to count the time necessary to rotate the rotating polygon mirror at a predetermined speed. Also, for the end timings of the unblanking signal 128 and the BD input permission signal 127, the BD signal 29 may be supplied to a JK flip-flop directly or may be delayed if necessary. This option also applies to the other embodiments described below.

Reference numeral 18a and 18b denote J/K flip-flops (hereinafter referred to generally as J/F flip-flops 18) which synthesize various start timing signals and termination timing signals to generate the mask signal 125, the unblanking signal 128, and the BD input permission signal 127, which are sent to the image control signal generating section 17. The section 17 sends the laser emitting permission signal 6 and the forced laser lighting signal 7 to a laser driver 201.

When the laser beam is normally scanning the image forming area 122, the section 17 outputs the forced laser lighting signal 7 having the same waveform as the unblanking signal 128, and then outputs the laser emitting permission signal 6 having the same waveform (or waveform of opposite logic value) as the mask signal 125. The forced laser lighting signal 7, however, is turned on when the BD signal is not detected, upon occurrence of a test print pattern, or the like. In the mask area along the subscanning dimension (that is, when the laser beam is not scanning the image area), the laser emitting permission signal 6 is turned off.

When the laser emitting permission signal 6 is off, the laser driver 201 turns off the drive signal 101 independent of the image signal VDO, whereas when the forced laser lighting signal 7 is on, it turns on the drive signal 101 independent of the image signal VDO and the laser emitting permission signal 6.

The unblanking signal 128 and the BD input permission signal 127 are sent to the masking circuit 19 which accepts the BD signal 110 only when the BD input permission signal 127 is active.

Figure 12:
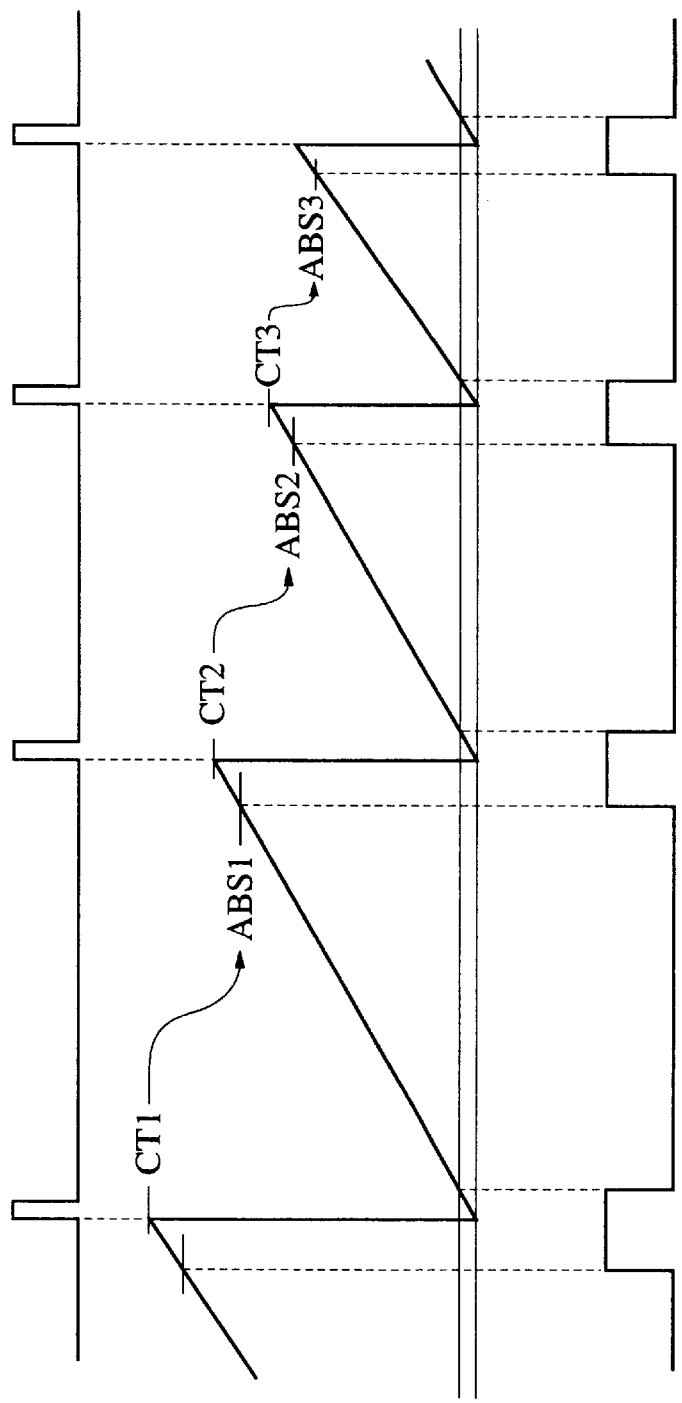
FIG. 12 is a flowchart illustrating an operation of a CPU in the fifth embodiment.

A description will now be given of the starting operation of the rotating polygon mirror 105, with reference to the waveforms illustrated in FIG. 12.

As described earlier, the main scanning counter 13 starts counting in synchronization with the BD signal 29. The count value of the main scanning counter 13 is stored in the registers 25a and 25b, with the BD signal 29 being the register write signal. The count values CT1 in the registers 25a and 25b are then read out by a read signal of the CPU 16. FIG. 12a illustrates the BD signal 29, FIG. 12b illustrates count values of the main scanning counter 13, and FIG. 12c illustrates an unblanking signal (BD input permission signal) 128. The BD signal 29 is supplied to interrupt terminals 8 as an external interrupt signal to the CPU 16. When an interruption by the BD signal 29 occurs, the CPU 16 causes the address counter 15 to select count values in capture registers 25a and 25b and reads them in via the data bus 9. Logic operations such as subtraction of a predetermined value from the read-in count values CT1 are performed to write in the unblanking start timing value ABS1 into the registers 22a and 22b. In writing in the unblanking start timing value ABS1 into the registers 22, the count values are selected by the address decoder 15 and written into the registers via the data bus 9. The same operations are subsequently repeated every time a BD signal 29 is input.

In this method, the CPU 16 computes ABS2 and ABS3 based on the count values CT2 and CT3. CPU 16 processing can be performed to convert the ABS2 and ABS3 values to values of the registers 22a and 22b, which store the unblanking start timing values, by laser emission at a timing that the BD signal 29 is output. This method of determining the ABS2 and ABS3 values will result in proper values in a case where the BD signal 29 is not output at a fixed interval, for example, during startup of the scanner motor 104.

The BD signal 29 is supplied to a phase comparator 300a of the scanner control circuit 300 to compare the phase thereof with a reference clock phase from a reference clock generating circuit 300b. Based on this comparison, a driver 301 controls the number of rotations of the scanner motor 104. When this is done, the scanner motor 104 is driven and rotated at a speed such that the phases of the BD signal 29 and the reference clock match.

To control the scanner motor 104 during its startup using such a scanner control circuit 300, it is necessary to supply the BD signal 29 to the scanner control circuit 300 before the scanner motor 104 starts rotating at a fixed speed. In this embodiment, it is possible to prevent continued exposure of the photosensitive drum 108 during scanner motor 104 startup because the BD signal 29 is supplied to the scanner control circuit 300 during scanner motor 104 startup without continuous laser lighting. This not only prolongs the life of the laser device 102 and prevents deterioration of the photosensitive drum 108, but also prevents staining of the device, staining on the reverse side of the transfer paper 112, or the like, caused by toner when a toner image is formed outside the image forming area 122.

Embodiment 2

Figure 2:
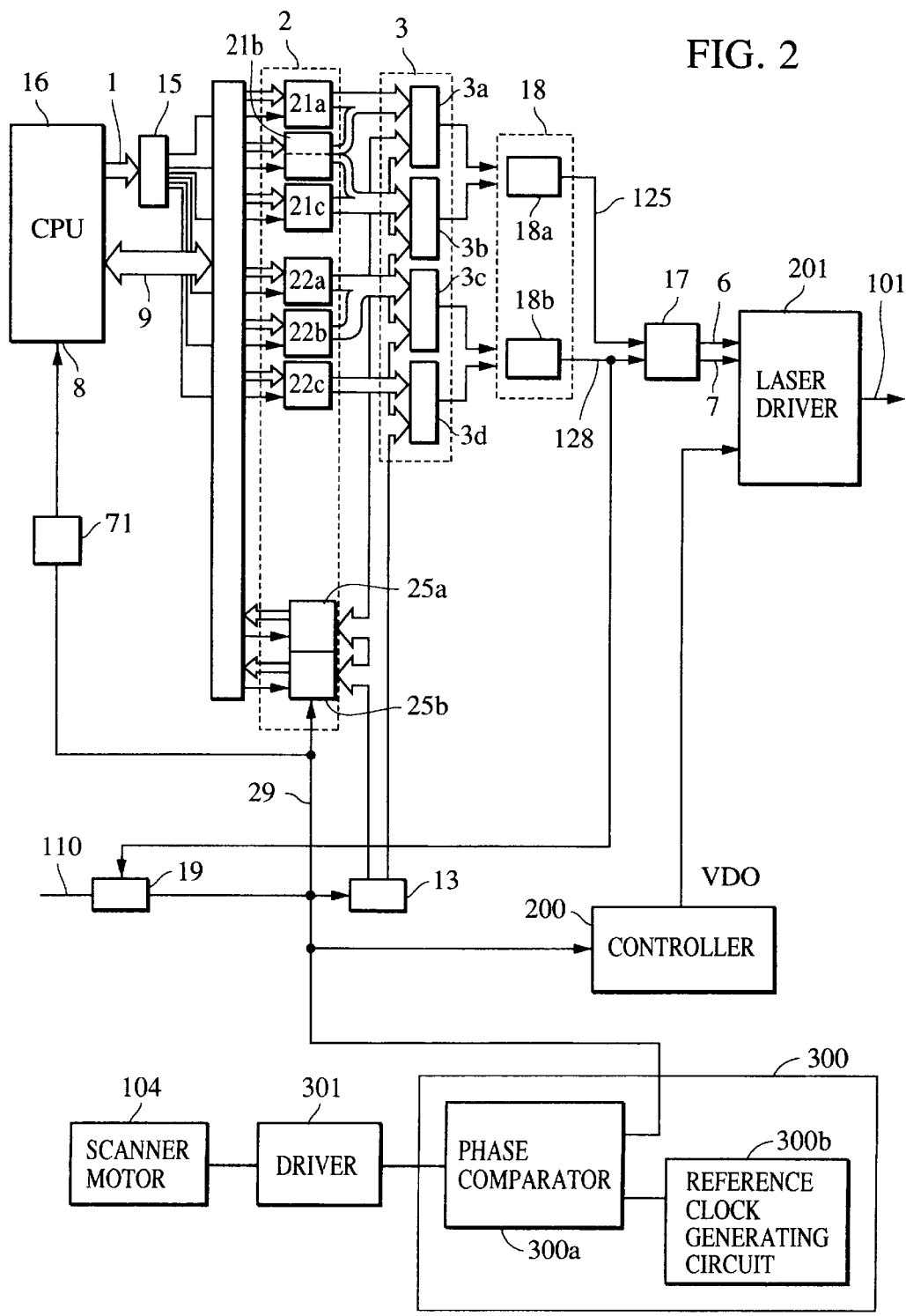
FIG. 2 is a circuit diagram for describing the first embodiment of the present invention.
Figure 3:
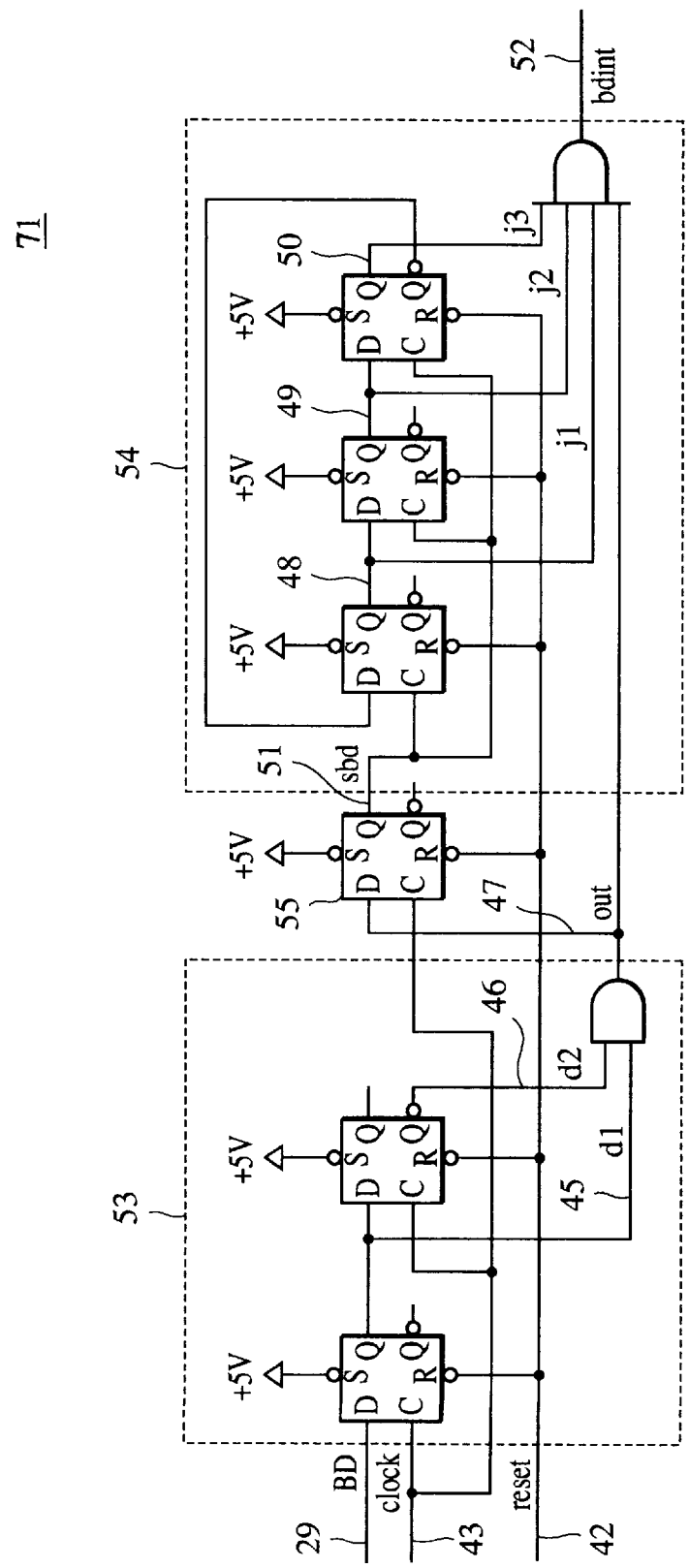
FIG. 3 is a timing chart for describing the first embodiment of the present invention.
Figure 4:
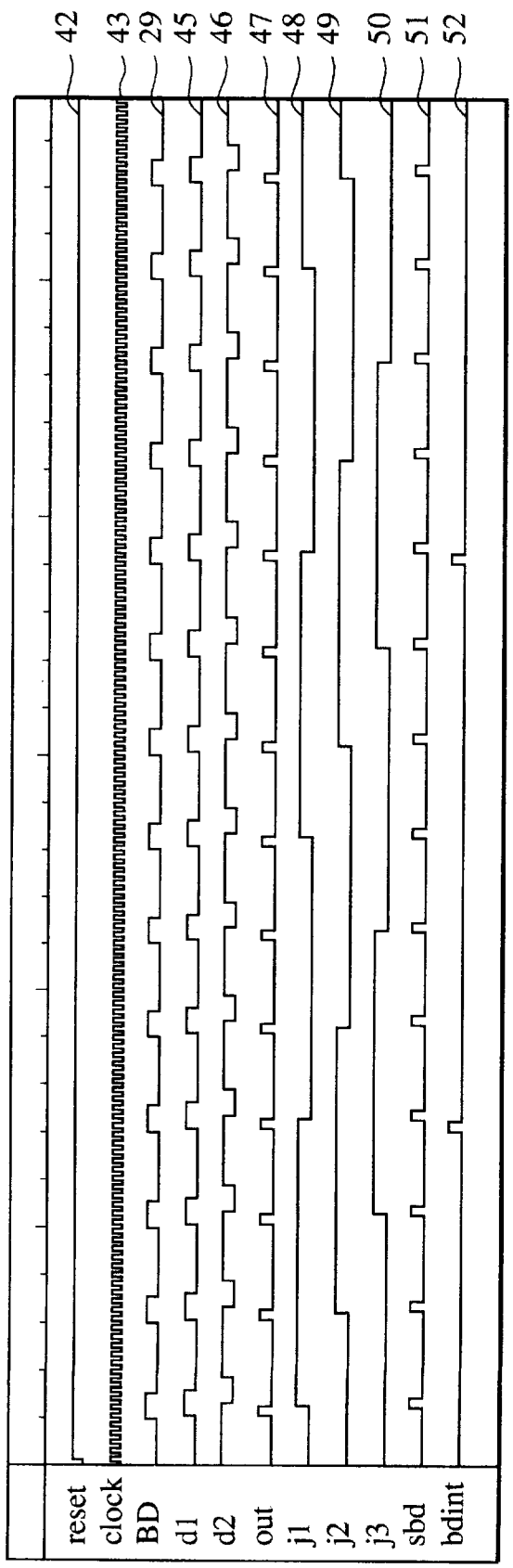
FIG. 4 is a circuit diagram for describing a second embodiment of the present invention.

In the previous embodiment, the CPU 16 was interrupted each time the BD signal 29 was generated in order to perform the above-described operations. Because the period between generations of the BD signal 29 is a few hundred microseconds, especially when a CPU 16 with a low processing speed is used or when some task must be performed at a high speed, it is necessary to lighten the load of the CPU by providing additional hardware. Accordingly, a description will be given of an example of a printer in which part of the previously described functions is transferred to such hardware to lighten the load of the CPU 16. The arrangement thereof is illustrated in FIG. 2. Parts having substantially the same functions as those of the above-described embodiment illustrated in FIG. 1 will be given the same reference numerals. In this embodiment, a BD signal frequency divider circuit 71 has been added to the arrangement of FIG. 1. FIG. 3 illustrates a construction of the BD signal frequency divider circuit 71. FIG. 4 illustrates a waveform for each component part of this circuit. In this circuit, the CPU 16 is not interrupted when a plurality of BD signals 29, generated upon a complete rotation of the polygon mirror 105, are sent to the CPU 16, but only when a BD signal 29 has been produced from a particular surface of the mirror 105. This feature reduces the working load of the CPU 16. This embodiment is described using a polygon having six faces, so that every time six BD signals 29 are generated only one of these six signals is sent to the CPU 16 as an interrupt signal.

The BD signal frequency divider circuit 71 shown in FIG. 3 basically comprises a wave-forming circuit 53 for forming a waveform after synchronization of the BD signal 29 with the clock signal 43, a frequency divider circuit 54 for sending one of the six generated BD signals 29, and a flip-flop 55 for connecting these circuits. After being initialized by a reset signal 42 from a reset circuit (not shown), these circuits operate in synchronism with the reference clock 43. Upon input of the BD signal 29 into the wave-forming circuit 53, the BD signal 29 is formed into a fixed waveform 47 in synchronism with the reference clock 43.

Figure 7:
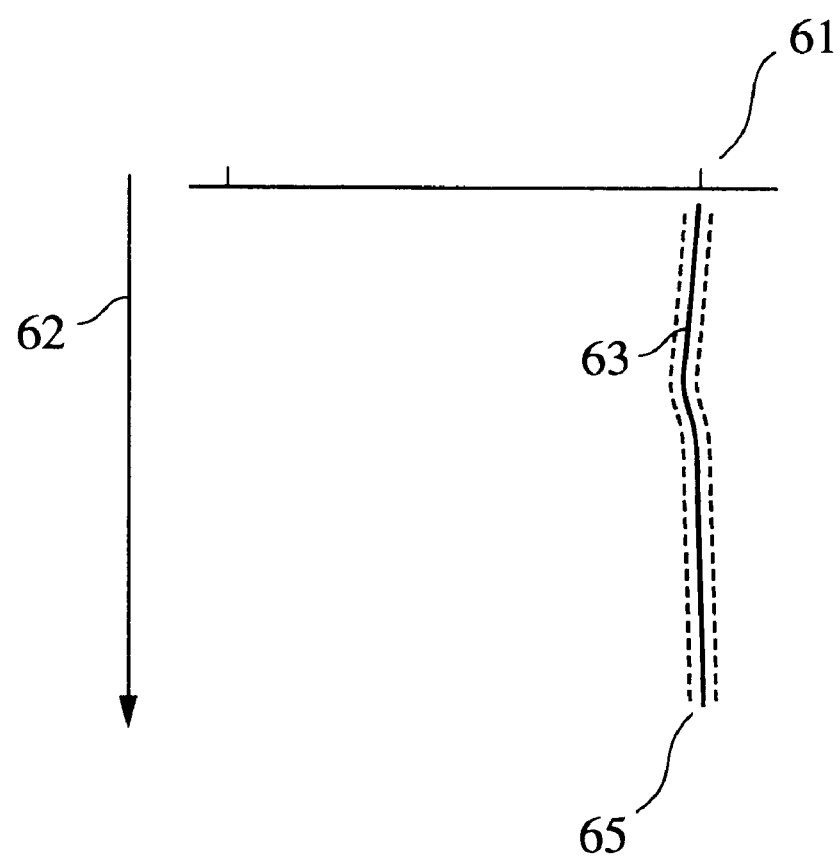
FIG. 7 is a timing chart for describing the third embodiment of the present invention.

The BD signal 29, illustrated in FIG. 7, appears to have an extremely short interval due to scaling of the figure. In an actual laser beam printer, this low-level time period is much longer than shown in FIG. 7. However, operations of the circuit do not differ from those of the actual laser beam printer.

The fixed waveform 47 is input to the frequency divider 54 via the flip-flop 55. A Johnson counter is used for the frequency divider 54, with the signals thereof having the waveforms denoted by reference numerals 48 to 51 of FIG. 4. Reference numeral 52 denotes a BD interrupt signal after frequency division, which is used to reduce the load of the CPU 16. Subsequently, as described in the previous embodiment, the CPU 16 sends an unblanking start timing signal of a specified value to the registers 22a and 22b, based on the values in the capture registers 25a and 25b. The BD signal frequency divider circuit 71 of the embodiment is also applicable to the embodiments described below.

Embodiment 3

Figure 5:
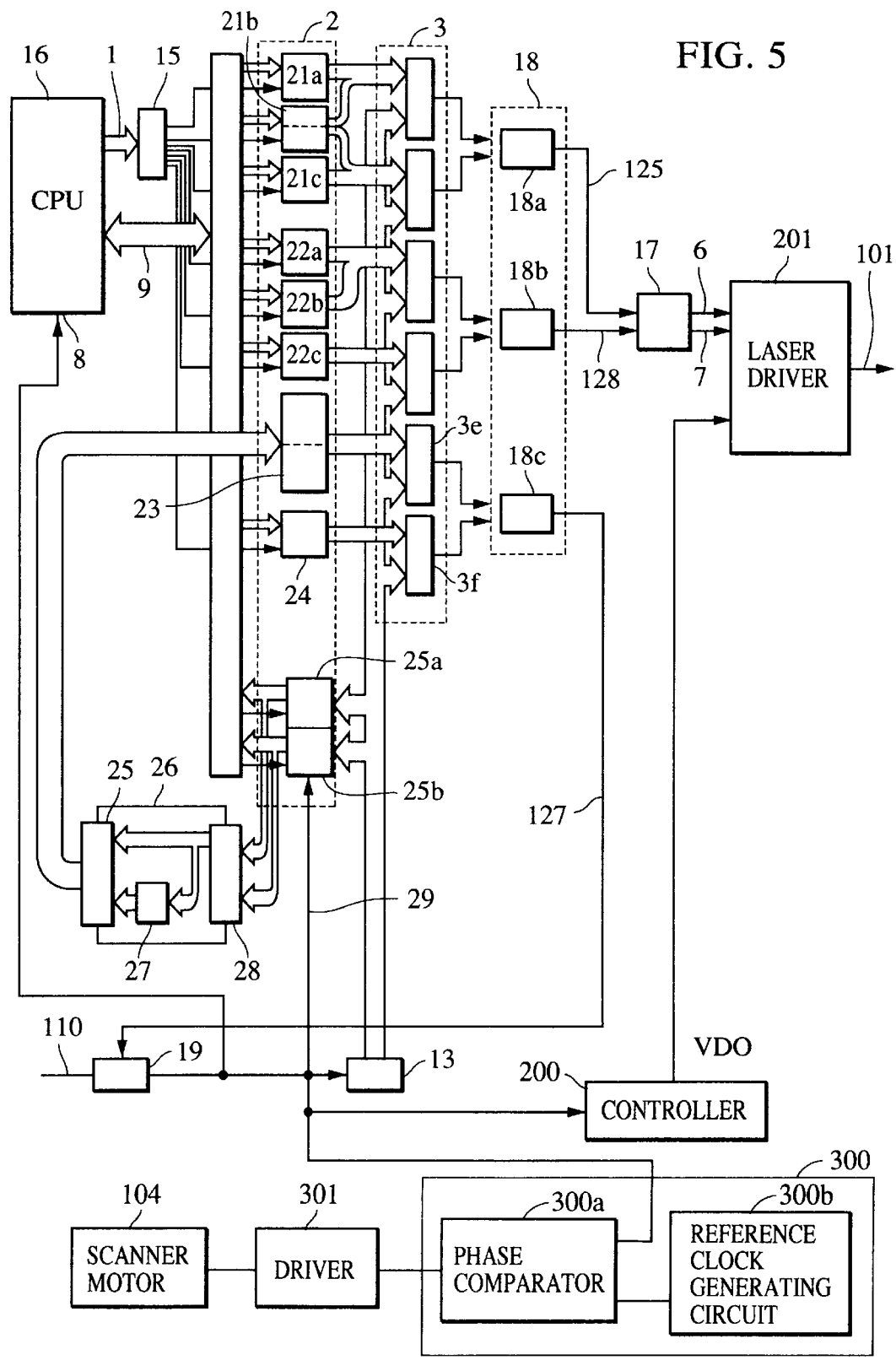
FIG. 5 is a circuit diagram for describing a third embodiment of the present invention.

A description of the third embodiment will be given with reference to FIG. 5. Parts having essentially the same functions as those previously described are given the same reference numerals and are not described below. This embodiment differs from Embodiment 1 as follows: (a) a 16-bit register 23, a 4-bit register 24, comparators 3e and 3f, and a J/K flip-flop 18 are provided, (b) the BD input permission signal 127 is generated independently of the unblanking signal 128, and (c) when the BD signal 29 is used as a register write signal, although the registers 25a and 25b have captured therein the count values of the main scanning counter 13, the values stored in the capture registers 25a and 25b are read out by a computing circuit 26.

A detailed description will now be given of the computing circuit 26, taking as an example a computing circuit for making the 16-bit length data from the registers 25a and 25b 0.9992 of their original value. Reference numeral 28 denotes a component part capable of dividing values and performing 1/128 computation. More specifically, 16-bit data input to the computing circuit is represented as binary digit values of D15, D14, D13, ,,,D1, D0. This circuit outputs a value shifted to the LSB side by an amount corresponding to 7 bits, that is, 0, 0, 0, 0, 0, 0, 0 D15, D14, D13, D12,,,,,D8, D7. For example, if a binary digit value of 0011010101011100B (=355CH) is input, the value is shifted toward the LSB side, and a value of 0000000001101010B (6AH) is output. The resulting value is input to an inversion circuit 27 to complement this value. The inversion circuit 27 is composed of an inverter. If the aforementioned result of 0000000001101010B (6AH) is input to this inversion circuit, the circuit outputs a value of 1111111110010101B (FF95H). Finally, a 16-bit full adder 25 is used to add this complement to the first values (from the capture registers 25a and 25b), which yields a value of 0011010011110001B (34F1H). This value is written into BD input permission signal 127 start timing registers 23a and 23b to set this value as the BD input permission signal 127 start timing. When this value matches the count value of the main scanning counter 13, the comparators 3 cause the start timing signal of the BD input permission signal 127 to be input to a J/K flip-flop 18c. The output of the J/K flipflop 18c is input as BD input permission signal 127 to the masking circuit 19. As in the previous embodiment, the masking circuit 19, which is composed of an AND gate or the like, is constructed so as not to allow sending out of the BD signal 110 as BD signal 29, until the BD input permission signal 127 is input.

By virtue of the foregoing arrangement, input of the nth BD scanning signal input permission signal is started upon elapse of 99.2% of the (n−1)th scanning BD signal period, which results in fewer erroneous detections, even if external noise is superimposed on the BD signal. Although in this example, the starting time of the input is fixed at 99.2%, the circuit 28 can comprise a shift register whose shift amount is made variable, so as to make possible adjustment of the BD input signal permission range. In addition, data to be written into the registers 23a and 23b can be obtained by simply subtracting a predetermined value from the values stored in the registers 25a and 25b.

Figure 16:
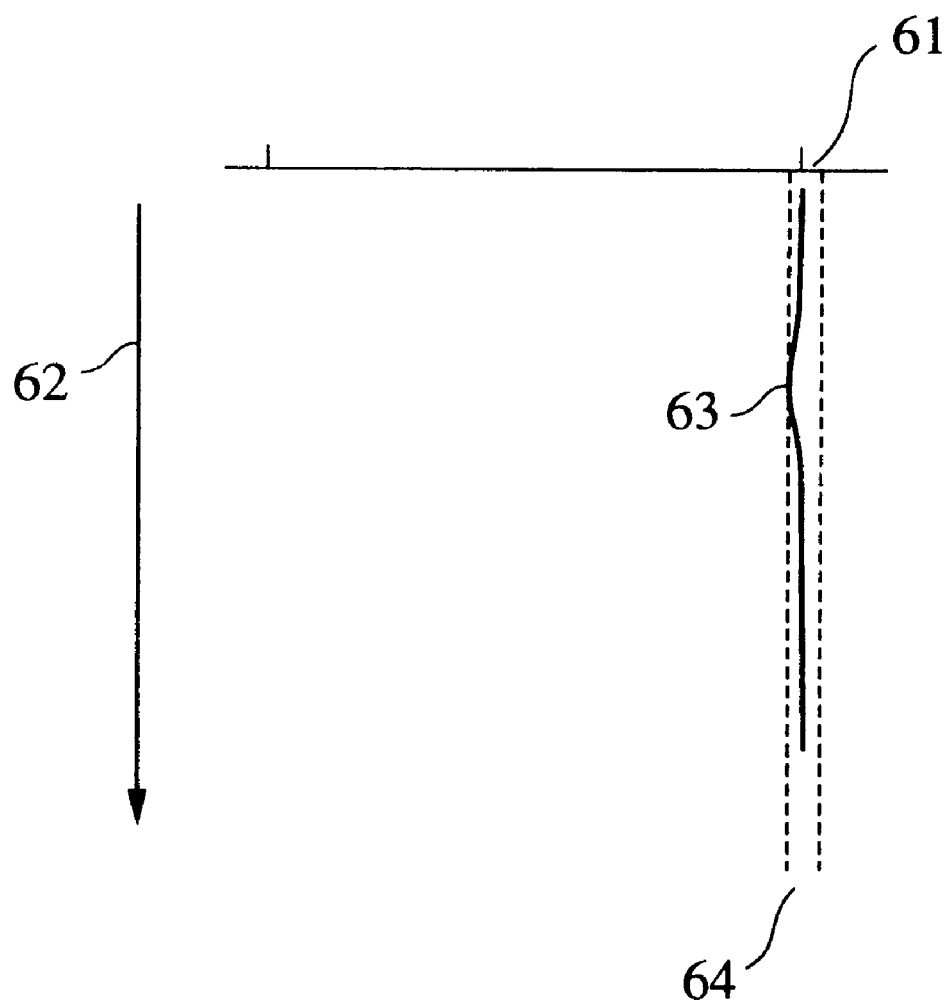
FIG. 16 is a timing chart for describing the case where a scanner motor has shifted.

FIG. 7, which corresponds to FIG. 16, illustrates a path taken by the BD signal 29 in the case where the scanner motor 104 has shifted. Even when scanner motor shifting occurs, since the BD signal input permission range is determined based on the previous BD scanning period, the BD signal input permission range will shift along with the BD signal 29. Although this can also be realized by Embodiment 1, the present embodiment allows a smaller BD signal input permission range to be set because the BD input permission signal 127 is generated independently.

Although the BD signal input permission range was determined based on the immediately previous BD scanning period in the above description, it should be understood that the determination may be made based on even earlier BD scanning periods.

It is also possible to ignore the effects of poor surface division precision of the rotating polygon mirror by basing the BD signal input permission range on a BD scanning period of an m number of scanning periods ago (where m is an integer) or of an integral multiple of m scanning periods ago in accordance with the number of surfaces m of the rotating polygon mirror. For example, when the rotating polygon mirror has six reflecting surfaces (m=6), the nth BD signal input permission range is computed with reference to the (n−6)th BD scanning period. This makes it possible to implement the present invention for rotating polygon mirrors having poor surface division precision. In this regard, the circuit configuration can be such as to allow the values of the start timing registers 23a and 23b of the BD input permission signal 127 to be switched depending on the number of mirror surfaces.

More specifically, the counting is started by inputting a certain BD signal 29. Then, the aforementioned computation is performed based on the count values up to the next BD signal 29 to determine the (m+1)th BD signal input permission range from the certain BD signal. The BD signal 29, having passed through the masking circuit 19, is sent to the counter 13. The counter values are then supplied to the registers 25a and 25b. The values are used for outputting the unblanking signal 128. The BD signal is sent to the controller 200, which synchronizes with the signal to output the image signal VDO.

The start timing signal of the unblanking signal 128 may also be developed with the same circuit, although in the foregoing description the start timing signal of the BD input permission signal 127 was specifically mentioned. In either case, computation employing the signals 127 and 128 does not require interruption of the CPU 16 by the BD signal 29.

Embodiment 4

Figure 6:
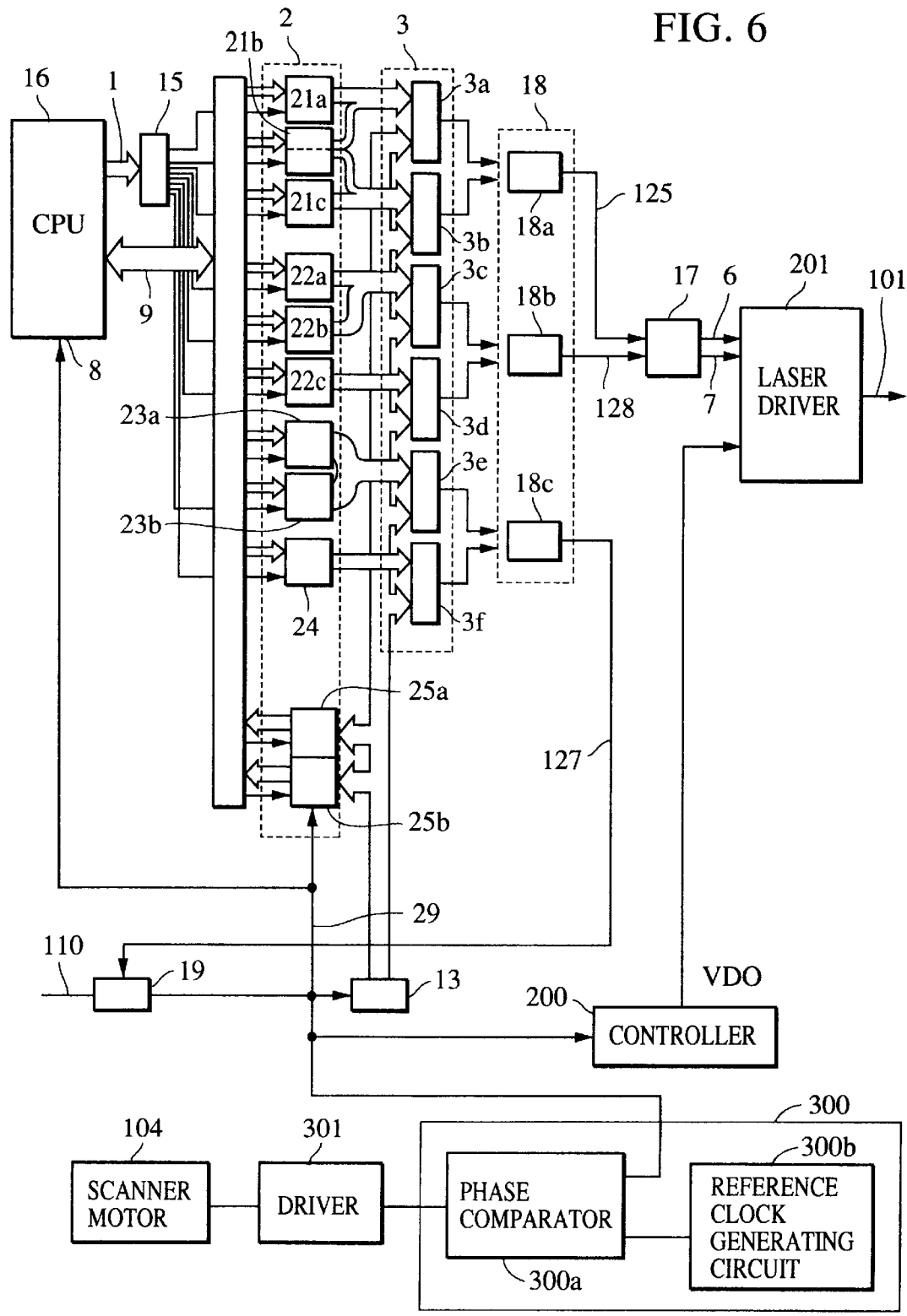
FIG. 6 is a circuit diagram for describing the third embodiment of the present invention.

The previous embodiment was described using the computing circuit 26. In this embodiment, an example will be given which produces similar effects without the use of such a circuit. A variety of control operations can be executed with the use of software, which will be described with reference to FIG. 6. The BD signal 29 is accommodated as an external interrupt signal 8 by the CPU 16. When interruption by the BD signal 29 occurs, the CPU 16 selects the values of the capture registers 25a and 25b using address decoder 15 and reads them in via the data bus 9. Computations described in Embodiment 3 are performed on these values, and the resulting values are written into the registers 23 having stored therein the unblanking start timing values. Writing to these registers is achieved by the CPU 16 selecting values as it does when reading values and writing the values into the registers 23 via the data bus 9. According to this method, it is possible to set the BD signal input permission range with greater freedom because the unblanking start timing signal is already set as a value stored in register 23. When the CPU 16 has extra capacity to perform some other operation by software, the number of circuits can be reduced by implementation of the present embodiment. Conversely, if the number of software operations of the CPU needs to be reduced, the construction of the above-described Embodiment 3 can be employed.

Embodiment 5

A description will now be given of Embodiment 5, with reference to FIG. 8. In the previous embodiment, the circuit configuration is such as to allow continued image formation even when the rotation speed of the scanner motor greatly differs from the predetermined rotation speed specified number of rotations. The image formed in this case is output as an abnormal image of a different scale along the main scanning dimension. Therefore, the printer needs to indicate to the user that an abnormal image has been output. In the present embodiment, a structure 30 is added, with predetermined values stored in the registers 32. These values indicate the range for handling the output as a BD error, laser lighting failure, or scanner motor rotation failure, when the output does not fall within this range. These values are compared with the count value of the main scanning counter 13 by comparators 33 to confirm that the BD signal 29 is arriving at the right time. This confirmation is achieved by verifying generation of the BD signal 29 during generation of a reference signal 35 output from the J/K flip-flop 34.

Figure 8:
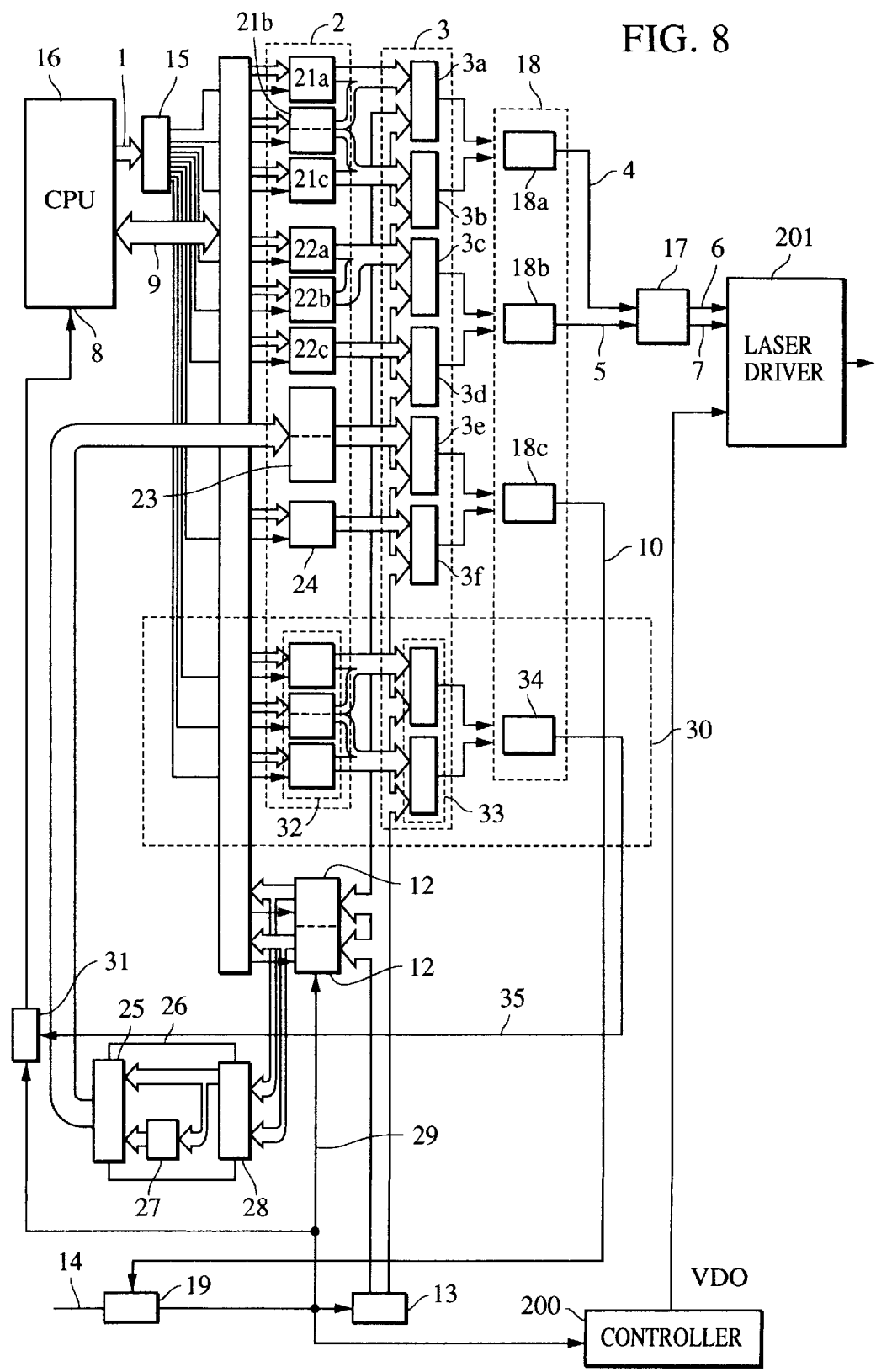
FIG. 8 is a circuit diagram for describing a fourth embodiment of the present invention.

FIG. 8 illustrates the case where the confirmation is achieved by using CPU 16 software. Reference numeral 31 denotes a circuit, like an AND gate, for masking the BD signal 29 at a period other than when the reference signal 35 is being generated at the masking circuit. More specifically, when there is no input to the interrupt terminals 8 it is judged that interruption did not occur within a specified range, that is, the BD signal 29 fell outside a specified period or did not occur. Therefore, the CPU 16 starts an error processing software which, for example, indicates on a display panel that a BD signal related error has occurred and that an abnormal image has been output.

A description will now be given of an operation of the CPU 16, with reference to FIGS. 9 to 11. The CPU 16 has an internal counter which is decremented by a predetermined clock value. When the count value becomes 0, it is assumed that an internal interruption occurs.

Figure 9:
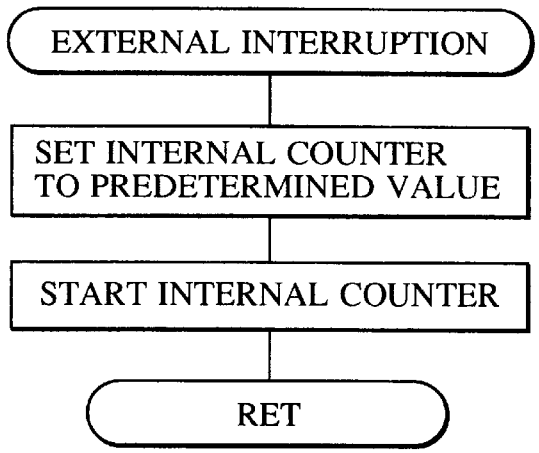
FIG. 9 is a timing chart for describing the fourth embodiment of the present invention.

When the BD signal 29 is introduced from the aforementioned circuit 31 to the interrupt terminals 8 of the CPU 16, the CPU 16 executes an interrupt operation as illustrated in FIG. 9. In the interrupt operation, a predetermined value corresponding to the maximum BD signal input permission range is set in the aforementioned internal counter to start it. Although during normal operation such an interrupt operation is repeated every BD period, in the case where the BD signal 29 is intercepted by the circuit 31 and the internal count value is decremented down to 0, which executes the internal interrupt operation of FIG. 10 is executed.

Figure 10:
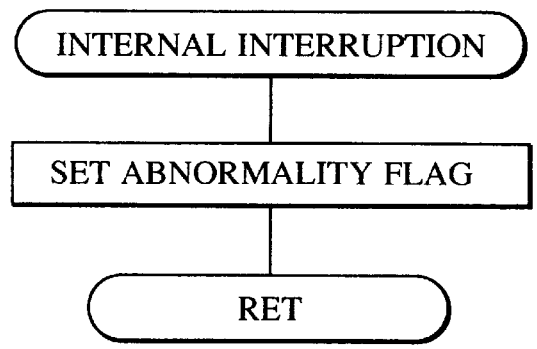
FIG. 10 is a circuit diagram for describing a fifth embodiment of the present invention.

In the internal interrupt operation of FIG. 10, an abnormality flag is set to indicate that an abnormal image has been output, and the operation then returns to the main routine.

Figure 11:
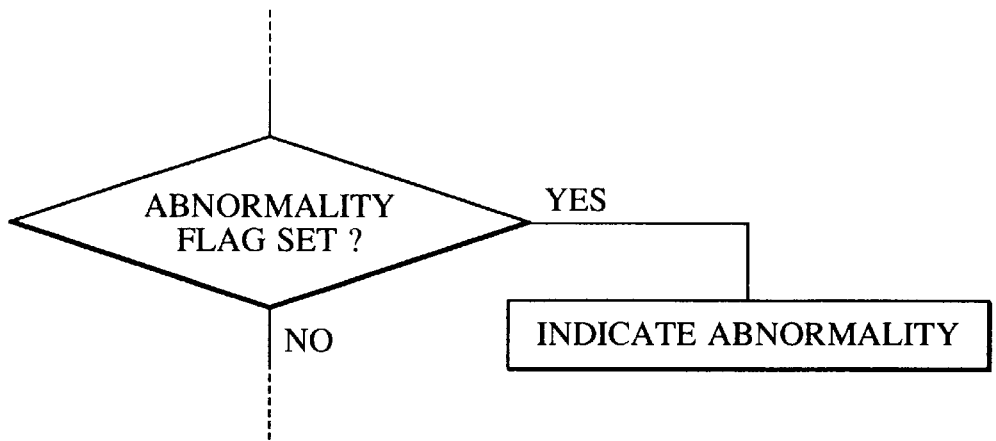
FIG. 11 is a circuit diagram for describing the fifth embodiment of the present invention.

FIG. 11 illustrates a part of the main routine, in which in the case where the aforementioned abnormality flag is set, an indicator unit (not shown) indicates that an abnormal image has been output. When the aforementioned indicator unit is connected to the controller 200, the CPU 16 sends a status that it has output an abnormal image, so that the controller 200 controls the aforementioned indicator unit. A latch circuit which latches the reference signal 35 with the BD signal 29 may also be used to judge whether or not an abnormal image has been output, based on the level of the latched signal, although in the foregoing description this judgment was made by the CPU 16.

As can be understood from the foregoing description, according to the first embodiment, it is possible to detect a laser beam 103 before and after the scanner motor 104 starts rotating at a constant speed to achieve scanner motor control with high precision by using, for example, a BD signal, without deteriorating the photosensitive drum 108 and shortening the life of the laser beam 103. According to the second embodiment, a suitable BD signal input permission range can be determined when changes occur in the rotating speed of the rotating polygon mirror 105, thereby making it possible to narrow down the BD input permission range as much as possible, prevent erroneous detection of the BD signal 110 resulting from noise, and eliminate omitted detection of the BD signal 110, which results in reliable and accurate detection of the BD signal 110. Reliable and accurate detection of the BD signal 110 prevents image displacement and the absence of modulation of the scanning line, so that a high-quality image can be formed.

In the laser beam printer of Embodiment 5, capable of determining a suitable BD signal input permission range, it is possible to inform the user that an image abnormality, resulting from changes in the mirror speed, has occurred.

Although in the above-described Embodiments 1 to 5 the start timings of the unblanking signal 128 and the BD input permission signal 127 were computed based on the values stored in the registers 25a and 25b, either one of them may be computed, with the other being set at a fixed value. In such a case, the effects of either one of the aforementioned Embodiments 1 or 2 can still be produced. When the start timing of the unblanking signal 128 (registers 22a and 22b values) is fixed, turning on the unblanking signal 128 during start-up of the rotating polygon mirror 105 allows the BD signal 29 to be sent out during start-up, thereby making it possible to control the rotation of the scanner motor 104 by the BD signal 29. The effects of Embodiment 2 can be produced even when the signal is turned off during start-up. For example, when the start timing of the BD input permission signal 127 (registers 23a and 23b values) is fixed, the construction may be such as to leave the masking circuit 19 closed during start-up.

The present invention is not limited to the aforementioned embodiments. Various modifications may be made without departing from the scope of the appended claims.

What is claimed is:

1. A light scanning apparatus comprising:
   a rotating polygon mirror for deflecting a light, said rotating polygon mirror being rotatable at a predetermined constant speed during a scanning operation;
   detecting means for detecting the deflected light at a predetermined position and for outputting detection signals based thereon; and
   predicting means for predicting a light detection timing of said detecting means,
   wherein after starting the rotation of said rotating polygon mirror and before the rotating speed of said rotating polygon mirror reaches the predetermined constant speed, said predicting means predicts the light detection timing, intervals of which become shorter as the rotating speed of said rotating polygon mirror approaches the predetermined constant speed.

2. A light scanning apparatus according to claim 1, further comprising image signal output means for outputting an image signal for modulating the light in synchronization with the detection signals output from said detecting means after the rotating speed of said rotating polygon mirror has reached the predetermined constant speed.

3. A light scanning apparatus according to claim 1, wherein said predicting means comprises measuring means for measuring an output interval of the detection signals output from said detecting means.

4. A light scanning apparatus according to claim 3, wherein said measuring means comprises time measuring means which measures a period from one of the detection signals to a following one of the detection signals for each output interval.

5. A light scanning apparatus according to claim 3, further comprising detection signal line completing/breaking means for completing or breaking a line for the detection signals output from said detecting means at a timing based on the output interval measured by said measuring means.

6. A light scanning apparatus according to claim 5, further comprising image signal output means for outputting an image signal for modulating the light in synchronization with the detection signals output from said detecting means after the rotating speed of said rotating polygon mirror has reached the predetermined constant speed, wherein the detection signals output from said detecting means are supplied to said measuring means and said image signal output means via said line completing/breaking means.

7. A light scanning apparatus according to claim 5, further comprising signal generating means for generating a signal to turn on the light based on the timing predicted by said predicting means, wherein said line completing/breaking means causes the line to be in a completed state while the signal is generated from said signal generating means.

8. A light scanning apparatus according to claim 1, further comprising signal generating means for generating a signal to turn on the light based on the timing predicted by said predicting means, wherein while said rotating polygon mirror is rotating at the predetermined constant speed, said signal generating means outputs the signal after elapse of a predetermined constant time from the output of the each of the detection signals from said detecting means.

9. A light scanning apparatus according to claim 1, further comprising signal generating means for generating a signal to turn on the light based on the timing predicted by said predicting means, wherein said signal generating means stops generating the signal in response to the detecting signals output from said detecting means.

10. A light scanning apparatus according to claim 1, further comprising rotation control means for controlling the rotation of said rotating polygon mirror based on the detection signals output from said detecting means.

11. A light scanning apparatus comprising:
a rotating polygon mirror for deflecting a light, said rotating polygon mirror being rotatable at a predetermined constant speed during a scanning operation;
detecting means for detecting the deflected light deflected from a predetermined position on said rotating polygon mirror and for outputting detection signals based thereon along a detection signal output line;
measuring means for measuring output intervals between the detection signals output from said detecting means; and
detecting signal line completing/breaking means for completing or breaking the line for the detection signals output from said detecting means at a timing based on a previous output interval measured by said measuring means.

12. A light scanning apparatus according to claim 11, further comprising image signal output means for outputting an image signal for modulating the light in synchronization with the detection signals output from said detecting means after the rotating speed of said rotating polygon mirror has reached the predetermined constant speed.

13. A light scanning apparatus according to claim 12, wherein said detection signal output from said detecting means is output to at least one of said measuring means and said image signal output means.

14. A light scanning apparatus according to claim 11, further comprising signal generating means for generating a signal to turn on the light at a timing when said detecting means detects the deflected light, wherein said signal generating means generates the signal only in the case where said detection signal line completing/breaking means causes the line to be in a completed state.

15. A light scanning apparatus according to claim 11, wherein said detection signal line completing/breaking means connects or interrupts the line before the rotating speed of said rotating polygon mirror has reached the predetermined constant speed.

16. A light scanning apparatus according to claim 11, further comprising judging means for judging whether or not a measurement of said measuring means is outside a predetermined range.

17. A light scanning apparatus according to claim 11, wherein said measuring means comprises time measuring means which starts counting a count value upon each detection signal output, and wherein said apparatus further comprises computing means for computing the period during which said detection signal line completing/breaking means causes the line to be in a completed state for an (m+1)th (m being an integer) detection signal after a certain detection signal, in accordance with the count value counted upon the certain detection signal and the count value counted upon an mth detection signal after the certain detection signal.

18. A light scanning apparatus according to claim 17, wherein said integer m is equal to the number of surfaces of said rotating polygon mirror or is an integral multiple thereof.

19. A light scanning apparatus according to claim 17, wherein said computing means has adding means for adding a complement of a value obtained by shifting a first binary value a predetermined number of times to said first binary value, said first binary value being a read out count value.

20. A light scanning apparatus according to claim 17, wherein said computing means comprises a microprocessor which performs an interrupt operation employing the detection signals as interrupt signals, and wherein the period for the (m+1)th detection signal after the certain detection signal is determined by the interrupt operation.

21. A light scanning apparatus comprising:
a rotating polygon mirror for deflecting a light, said polygon mirror being rotatable at a predetermined constant speed during a scanning operation;
detecting means for detecting the deflected light at a predetermined position and for outputting detection signals based thereon; and
means for turning on a light source at a light detection timing of said detecting means,
wherein after starting the rotation of said rotating polygon mirror and before the rotating speed of said rotating polygon mirror reaches the predetermined constant speed, said turn-on means turns on the light source at timing intervals which become shorter as rotating speed of said rotating polygon mirror approaches the predetermined constant speed.

22. An apparatus according to claim 21, further comprising rotation control means for controlling the rotation of said rotating polygon mirror based on the detection signals output from said detection means.

23. An apparatus according to claim 21, further comprising measuring means for measuring a detection interval of the scanned light by said detection means.

24. An apparatus according to claim 23, further comprising gating means for gating an output from said detecting means, wherein said gating means gates the output from said detection means based on the detection interval of the scanned light measured by said measuring means when the polygon mirror is rotating at the predetermined constant speed.

25. An apparatus according to claim 21, wherein said means for turning on the light source comprises predicting means for predicting the light detection timing of said detecting means.

26. A light scanning apparatus comprising:
a rotating polygon mirror for deflecting a light, said rotating polygon mirror being rotatable at a predetermined constant speed during a scanning operation;
detecting means for detecting the deflected light deflected from a predetermined position on said rotating polygon mirror and for outputting signals based thereon along a signal output line;
measuring means for measuring intervals between the outputs from said detecting means; and
gating means for gating the outputs along the signal output line from said detecting means based on a previous interval measured by said measuring means.

27. An apparatus according to claim 26, further comprising means for turning on the light when said gating means is not gating the output from said detecting means.

28. An apparatus according to claim 26, wherein the output from said detecting means is given to said measuring means through said gating means.

* * * * *